3,095,425
Patented June 25, 1963

3,095,425
ALKANOYLTHIAXANTHENES AND -XANTHENES
Charles L. Zirkle, Haddon Heights, N.J., assignor to Smith Kline & French Laboratories, Philadelphia, Pa., a corporation of Pennsylvania
No Drawing. Filed Aug. 14, 1959, Ser. No. 833,703
7 Claims. (Cl. 260—328)

This invention relates to new 10-aminoalkyl-10-alkanoylthiaxanthenes and 9-aminoalkyl-9-alkanoylxanthenes which have useful pharmacodynamic activity.

More specifically the compounds of this invention have utility as tranquilizers, antiemetics, antihistaminics, antispasmodics and general central nervous system depressants.

The novel compounds of this invention are represented by the following general formula:

FORMULA I

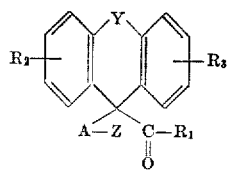

when:
Y represents sulfur or oxygen;
$R_1$ represents lower alkyl;
$R_2$ and $R_3$ represent hydrogen, halogen having an atomic weight of less than 80, trifluoromethyl, lower alkyl, preferably methyl, lower alkoxy, preferably methoxy, or lower alkylthio, preferably methylthio;
A represents a divalent, saturated, straight or branched alkylene chain having 2 to 4 carbon atoms separating the thiaxanthene or xanthene moiety and the Z moiety to which it is attached by at least 2 carbon atoms; and
Z represents di-lower alkylamino, N-pyrrolidinyl, N-piperidyl, C-(N-lower alkyl)piperidyl, N-piperazinyl, N'-formyl-N-piperazinyl, N'-lower alkyl-N-piperazinyl, N'-hydroxyethyl-N-piperazinyl, N'-acetoxyethyl-N-piperazinyl, N'-hydroxyethoxyethyl-N-piperazinyl or N'-hydroxyethoxyethoxyethyl-N-piperazinyl.

Advantageous compounds of this invention are represented by the following structural formula:

FORMULA II

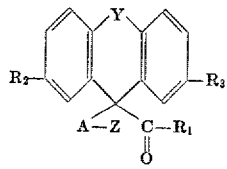

when:
Y represents sulfur or oxygen;
$R_1$ represents lower alkyl;
$R_2$ and $R_3$ represent hydrogen, chloro or trifluoromethyl;
A represents ethylene, 1-methylethylene, or 2-methylethylene; and
Z represents di-lower alkylamino, N'-methyl-N-piperazinyl, N'-hydroxyethyl-N-piperazinyl, N'-acetoxyethyl-N-piperazinyl, N'-hydroxyethoxyethyl-N-piperazinyl or N'-hydroxyethoxyethyl-N-piperazinyl.

By the terms "lower alkyl" and "lower alkoxy" where used herein alone or in combination with other terms, groups having from 1 to 4, preferably 1 to 2 carbon atoms are indicated.

This invention also includes stable, pharmaceutically acceptable, acid addition salts of the above defined bases formed with nontoxic organic and inorganic acids. Such salts are easily prepared by methods known to the art. The base is reacted with either the calculated amount of organic or inorganic acid in aqueous miscible, solvent such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mondelic, cinnamic, citraconic, aspartic, stearic, palmitic, itaconic, glycolic, p-aminobenzoic, glutamic, benzene sulfonic and theophylline acetic acids as well as with the 8-halotheophyllines, for example 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well-known to the art.

The novel 10-aminoalkyl-10-alkanoylthiaxanthenes and 9-aminoalkyl-9-alkanoylxanthenes of this invention are prepared as shown in the following synthetic scheme:

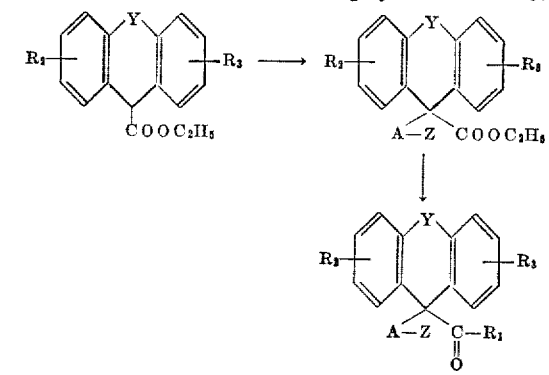

The terms Y, $R_1$, $R_2$, $R_3$, A and Z are as previously defined.

According to the above procedure, the 10-thiaxanthene- or 9-xanthenecarboxylic acid ester starting material in an inert organic solvent such as toluene or xylene is treated with an equal molar amount of potassium or sodium. To this mixture is added at least an equal molar amount, preferably an excess, of an aminoalkylhalide and the resulting solution is heated, conveniently at the reflux temperature of the solvent, for about 16 to 30 hours. Advantageously the reaction mixture is worked up by washing with a lower alcohol such as ethanol, extracting the organic solution with dilute hydrochloric acid, neutralizing the aqueous solution, extracting with an organic solvent such as chloroform or ether and evaporating the solvent to give the intermediate 10-aminoalkyl-10-thiaxanthene- or 9-aminoalkyl-9-xanthenecarboxylic acid ester.

Conversion of the above prepared intermediate ester to the alkanoyl compounds of this invention is accomplished by means of a Grignard reaction. The intermediate ester in an organic solvent such as, preferably benzene, is added to a solution of an alkyl magnesium halide, advantageously an alkyl magnesium bromide in dry ether preferably diethyl ether. The reaction mixture is stirred and refluxed for about 6 to 15 hours, preferably about 10 to 12 hours. Hydrolysis with an excess of an acidic reagent such as hydrochloric acid or, preferably, ammonium chloride and working up by washing with an inert organic solvent such as benzene or ether, making the aqueous solution basic, extracting with an inert organic solvent such as benzene or ether and evaporating the solvent in vacuo gives the 10-aminoalkyl-10-alkanoyl-thiaxanthene or 9-aminoalkyl-9-alkanoylxanthene compounds of this invention.

Certain N-substituted piperazinylalkyl derivatives of this invention are prepared by further N-alkylation of the N-hydrogen analogues to form the various N-substituted piperazinyl compounds of Formula I.

The 10-thiaxanthene- or 9-xanthenecarboxylic acid ester starting materials are either known to the art or are prepared according to the following procedure:

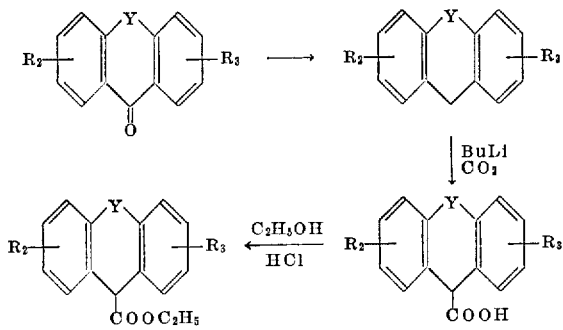

The terms Y, $R_2$ and $R_3$ are as previously defined.

The thiaxanthenones or xanthenones are reduced by catalytic hydrogenation or, preferably, with sodium and an alcohol such as, for example isobutyl or isoamyl alcohol. Treatment of the resulting thiaxanthene or xanthene with butyl lithium and carbon dioxide gives the 10-thiaxanthene- or 9-xanthenecarboxylic acid which is esterified with a lower alcohol such as ethanol in the presence of an acid catalyst such as hydrogen chloride.

The thiaxanthenones and xanthenones of the above process are either known to the art or may be prepared in a variety of ways such as:

(1) A thiosalicylic acid may be treated with benzene and concentrated sulfuric acid.

(2) Reaction of a sodium or potassium phenolate or thiophenolate with an o-chlorobenzoic acid and cyclization of the resulting o-aryloxy-(or o-arylthio)-benzoic acid by heating, advantageously in the presence of an acidic reagent.

It will be readily apparent to one skilled in the art that certain of the compounds of this invention, notably those in which A is represented by an aliphatic carbon chain branched so that an asymetric carbon atom is formed, may be present as optical isomers. The connotation of the general formulae presented herein is to include all isomers, the separated d or l optical isomers as well as the dl mixture of these isomers.

The following examples are not limiting but are illustrative of compounds of this invention and the procedures for their preparation and will serve to make fully apparent all of the compounds embraced by the general formula given above.

*Example 1*

To a solution of 35.0 g. of ethyl 10-thiaxanthene carboxylate in 600 ml. of dry toluene is added 5.0 g. of potassium and the resulting mixture is stirred at room temperature for two hours, then refluxed for ten minutes. To the cooled mixture is added 45.0 g. of 2-chloro-1-dimethylaminoethane. The resulting mixture is refluxed for 20 hours, then treated with 100 ml. of t-butanol. After stirring for one hour, ethanol (30 ml.) is added. The toluene layer is extracted with dilute hydrochloric acid. The aqueous layer is made basic, extracted with chloroform and the chloroform extract is evaporated and distilled to give ethyl 10-(2'-dimethylaminoethyl)-10-thiaxanthenecarboxylate, B.P. 182–189° C. (0.1–0.12 mm.).

A mixture of 2.6 g. of magnesium turnings in 25 ml. of dry ether and 12.2 g. of ethyl bromide in 25 ml. of dry ether is refluxed for 45 minutes, then filtered. A benzene solution of ethyl 10-(2'-dimethylaminoethyl)-10-thiaxanthenecarboxylate (18.6 g. in 125 ml. of benzene) is added slowly. The ether is distilled out, additional benzene is added and the mixture is refluxed for 11 hours, then poured into excess aqueous ammonium chloride. Extracting with benzene, making the aqueous solution basic with ammonium hydroxide, reextracting with benzene, and evaporating and distilling the combined extracts gives 10 - (2' - dimethylaminoethyl) - 10 - propionylthiaxanthene, B.P. 160–167° C. (0.2–0.25 mm.).

A solution of the free base (1.0 g. in 50 ml. of ethyl acetate) is treated with an equivalent amount of maleic acid. Concentration and cooling gives the maleate salt, M.P. 133–135° C.

*Example 2*

To a solution of 55.0 g. of ethyl 10-thiaxanthene carboxylate in 800 ml. of dry toluene is added 8.0 g. of potassium. The resulting mixture is stirred for two hours, then heated to reflux. To the cooled mixture is added 30.0 g. of 3-chloro-1-dimethylaminopropane in 100 ml. of toluene. After refluxing for 24 hours, 50 ml. of ethanol is added. The toluene layer is extracted with dilute hydrochloric acid, the acid extracts are neutralized with sodium carbonate and extracted with chloroform. The extracts are dried, evaporated and distilled to give ethyl 10-(3'-dimethylaminopropyl)-10-thiaxanthenecarboxylate, B.P. 194–198° C. (0.1–0.2 mm.).

A mixture of 2.6 g. of magnesium turnings in 25 ml. of dry ether and 12.2 g. of ethyl bromide in 25 ml. of dry ether is refluxed for 45 minutes, then filtered. To this solution is added 19.4 g. of ethyl 10-(3'-dimethylaminopropyl)-10-thiaxanthenecarboxylate in 125 ml. of dry benzene. The ether is distilled out and more benzene is added to the mixture. After refluxing with stirring for 12 hours, the mixture is poured into excess ammonium chloride in aqueous solution. After cooling and extracting with benzene, the aqueous layer is made basic with ammonium hydroxide and extracted with benzene. The benzene extracts are combined, dried over potassium carbonate, evaporated and distilled to give 10-(3'-dimethylaminopropyl)-10-propionylthiaxanthane, B.P. 153–157° C. (.05 mm.).

*Example 3*

To a solution of 4.8 g. of magnesium turnings, 31.2 g. of methyl iodide and 100 ml. of dry ether which has been refluxed for 45 minutes, then filtered is added 34.1 g. of ethyl 10 - (2' - dimethylaminoethyl)-10-thiaxanthenecarboxylate, prepared as in Example 1, in 200 ml. of dry benzene. After stirring and refluxing the mixture for 12 hours, it is poured into excess aqueous ammonium chloride. Working up as in Example 2 gives 10-acetyl-10-(2'-dimethylaminoethyl)thiaxanthene.

An ethereal solution of the free base is treated with an excess of hydrogen chloride to give the hydrochloride salt.

*Example 4*

A mixture of 94 g. of 5-chloro-2-mercaptobenzoic acid, 900 ml. of concentrated sulfuric acid and 300 ml. of dry benzene is heated at reflux for five minutes, then stirred at room temperature for 24 hours. The mixture is poured into ice. The precipitate is filtered, washed with water, with dilute ammonium hydroxide and with ethanol to give 2-chloro-10-thiaxanthenone.

To a solution of 35 g. of 2-chloro-10-thiaxanthenone in 700 ml. of refluxing isoamyl alcohol is slowly added 20 g. of sodium. The resulting mixture is refluxed for 30 minutes. The excess alcohol is steam distilled and the residue is cooled, treated with cold water and filtered to give crystalline 2-chlorothiaxanthene.

Forty grams of butyl bromide in 75 ml. of ether is added to 5.0 g. of lithium in 300 ml. of ether at $-10°$ C. and the mixture is slowly warmed to $+5°$ C. To this mixture is added 25 g. of 2-chlorothiaxanthene. After refluxing for one hour, then cooling in Dry Ice, the mixture is treated, under nitrogen, with 750 ml. of ether saturated with carbon dioxide in a Dry Ice-alcohol bath. The mixture is stirred in the Dry Ice bath for two hours, then filtered. The filtrate is treated with ethanol and water, then filtered. The aqueous layer is acidified and filtered to give 2-chloro-10-thiaxanthenecarboxylic acid as a white solid. This carboxylic acid is esterified by refluxing in excess ethanol containing hydrogen chloride, then concentrating the solution, diluting with ether, washing with water and sodium bicarbonate solution and distilling to give ethyl 2-chloro-10-thianthenecarboxylate.

The above prepared carboxylate in toluene solution is treated with potassium and then with an excess of 3-chloro-1-dimethylaminopropane. Refluxing the mixture for 24 hours and working up as in Example 2 gives ethyl 2-chloro - 10 - (3' - dimethylaminopropyl)-10-thiaxanthene-carboxylate.

An ether solution of ethyl magnesium bromide, prepared from 2.6 g. of magnesium, 12.2 g. of ethyl bromide and 50 ml. of ether as in Example 2, is treated with 21.2 g. of ethyl 2-chloro-10-(3'-dimethylaminopropyl)-10-thiaxanthenecarboxylate in 100 ml. of dry benzene. Stirring and refluxing the mixture for 12 hours, pouring it into aqueous ammonium chloride solution and working up as in Example 2 gives 2-chloro-10-(3'-dimethylaminopropyl)-10-propionylthiaxanthene.

The free base in ether solution is treated with an excess of hydrogen chloride to give the hydrochloride salt.

*Example 5*

A solution of 13.5 g. of propyl bromide in 25 ml. of dry ether is added slowly to 2.4 g. of magnesium turnings in 25 ml. of ether and the resulting mixture is refluxed for 40 minutes, then filtered. To this solution is added 17.0 g. of ethyl 10-(2'-dimethylaminoethyl)-10-thiaxanthenecarboxylate, prepared as in Example 1, in 125 ml. of dry benzene. Refluxing for 12 hours, treating with excess aqueous ammonium chloride and working up as in Example 2 gives 10-butyryl-10-(2'-dimethylaminoethyl)-thiaxanthene.

*Example 6*

An ether solution of butyl magnesium bromide, prepared by refluxing 2.4 g. of magnesium turning, 15.0 g. of butyl bromide and 50 ml. of ether for 45 minutes and filtering, is treated with 17.0 g. of ethyl 10-(2'-dimethylaminoethyl)-10-thiaxanthenecarboxylate, prepared as in Example 1, in 100 ml. of dry benzene. After refluxing for 10 hours, treating with ammonium chloride solution and working up as in Example 2, 10-(2'-dimethylaminoethyl)-10-valerylthiaxanthene is obtained.

*Example 7*

Sodium (10.0 g.) is added slowly to a mixture of 24.2 g. of 2-methoxy-10-thiaxanthenone in 500 ml. of refluxing isoamyl alcohol. The resulting mixture is refluxed for 30 minutes. The excess alcohol is steam distilled and the residue is cooled, diluted with cold water and filtered to give the solid product, 2-methoxythiaxanthene.

Treatment of 2-methoxythiaxanthene with butyl lithium and carbon dioxide as in Example 4 with esterification of the resulting 2-methoxy-10-thiaxanthenecarboxylic acid gives ethyl 2-methoxy-10-thiaxanthenecarboxylate.

A solution of 15.0 g. of the above prepared carboxylate in 250 ml. of dry xylene is treated with 2.0 g. of potassium. After stirring for two hours, heating to reflux and cooling, 18.0 g. of 2-chloro-1-dimethylaminoethane is added. Refluxing for 24 hours, diluting with ethanol, extracting with acid, neutralizing the acid extracts, extracting into chloroform and removing the chloroform in vacuo gives ethyl 2 - methoxy - 10-(2'-dimethylaminoethyl)-10-thiaxanthenecarboxylate.

An ether solution of ethyl magnesium bromide, made as in Example 1 from 2.6 g. of magnesium, 12.2 g. of ethyl bromide and 50 ml. of ether is treated with 20.2 g. of ethyl 2-methoxy-10-(2'-dimethylaminoethyl)-10-thiaxanthenecarboxylate in 125 ml. of dry benzene. Refluxing for 10 hours, treating with aqueous ammonium chloride extracting with benzene, neutralizing the aqueous solution, reextracting with benzene and evaporating the solvent from the combined benzene extracts yields 2-methoxy - 10 - (2'-dimethylaminopropyl)-10-propionylthiaxanthene.

An ethyl acetate solution of the free base is treated with an equivalent amount of citric acid to give, upon concentration and cooling, the citrate salt.

*Example 8*

Potassium (3.9 g.) is added to a solution of 27.0 g. of ethyl 10-thiaxanthenecarboxylate in 500 ml. of dry toluene and the resulting mixture is stirred at room temperature for two hours, then refluxed for ten minutes. A solution of 35.0 g. of 1-(2'-chloroethyl)-4-methylpiperazine in 100 ml. of toluene is added and the mixture is refluxed for 20 hours, washed with ethanol and extracted with dilute hydrochloric acid. The acid extracts are made basic with sodium carbonate and extracted with chloroform. Evaporation of the chloroform in vacuo gives ethyl 10 - [2'-(4''-methyl-1''-piperazinyl)-ethyl]-10-thiaxanthenecarboxylate.

Treating the above prepared carboxylate (19.8 g.) with ethereal ethyl magnesium bromide, prepared as in Example 1 from 2.6 g. of magnesium, 12.2 g. of ethyl bromide and 50 ml. of ether, refluxing the resulting mixture for 12 hours and working up as in Example 7 gives 10-[2'-(4''-methyl-1''-piperazinyl)ethyl]-10-propionylthiaxanthene.

A solution of 1 g. of the free base in 50 ml. of ether is treated with excess alcoholic hydrogen bromide. Dilution with ether and filtration gives the hydrobromide salt.

*Example 9*

A solution of 54.0 g. of ethyl 10-thiaxanthenecarboxylate in 1200 ml. of try toluene is heated with 7.8 g. of potassium. After stirring for two hours, heating to reflux and cooling, 68.0 g. of 1-formyl-4-(2'-chloroethyl)-piperazine is added. Refluxing for 20 hours and working up as in Example 8 gives ethyl 10-[2'-(4''-formyl-1''-piperazinyl)ethyl]-10-thiaxanthenecarboxylate.

Treatment of this carboxylate with ethyl magnesium bromide and hydrolyzing with aqueous ammonium chloride gives 10-[2'-(4''-formy-1''-piperazinyl)ethyl]-10-propionylthiaxanthene.

*Example 10*

A mixture of 30.0 g. of 10-[2'-(4''-formyl-1''-piperazinyl)ethyl]-10-propionylthiaxanthene, prepared as in Example 9, in 300 ml. of ethanol and 200 ml. of water containing 10 ml. of 40% sodium hydroxide solution is refluxed for 15 minutes. The ethanol is removed in vacuo and the residue is treated with benzene and water. The benzene layer is isolated, dried and evaporated in vacuo to give, as the residue, 10-(2'-N-piperazinylethyl)-10-propionylthiaxanthene.

*Example 11*

Ethylene oxide (1.0 g.) is added to a mixture of 5.0 g. of 10-(2'-N-piperazinylethyl)-10-propinoylthiaxanthene, made as in Example 10, in 50 ml. of methanol. The mixture is refluxed for two hours and concentrated in vacuo to give, as the residue, 10-[2'-(4''-hydroxyethyl-1''-piperazinyl)ethyl]-10-propionylthiaxanthene.

*Example 12*

A mixture of 3.5 g. of 10-[2'-(4''-hydroxyethyl-1''-piperazinyl)ethyl]-10-propionylthiaxanthene, made as in Example 11, and 20 ml. of benzene is treated with 1.0 g. of acetyl chloride in 15 ml. of benzene. The resulting mixture is refluxed for 30 minutes, cooled and concentrated in vacuo to give, as the residue, 10-[2'-(4''-acetoxyethyl - 1'' - piperazinyl)ethyl]-10-propionylthiaxanthene monohydrochloride. Treatment of this monohydrochloride in ethanol with an equivalent amount of ethanolic hydrogen chloride, concentration and cooling gives 10-[2'- (4''-acetoxyethyl-1''-piperazinyl)ethyl]-10-propionylthiaxanthene dihydrochloride.

Example 13

A mixture of 3.7 g. of 10-(2'-N-piperazinylethyl)-10-propionylthiaxanthene, made as in Example 10, 1.8 g. of 2-bromo-2'-hydroxyethyl ether and 3.0 g. of potassium carbonate in 75 ml. of toluene is refluxed for eight hours. The reaction mixture is poured into water. The toluene layer is separated and extracted with dilute hydrochloric acid. The acidic extracts are made basic and extracted with benzene. Evaporation of the benzene yields crude 10 - [2' - (4''-hydroxyethoxyethylpiperazinyl)ethyl]-10-propionylthiaxanthene.

Example 14

A mixture of 7.5 g. of 10-[2'-(4''-hydroxyethyl-1''-piperazinyl)ethyl]-10-propionylthiaxanthene dihydrochloride, prepared by treating the N-hydroxyethyl free base prepared as in Example 11 with an excess of ethanolic hydrogen chloride, and 3.5 g. of thionyl chloride in 75 ml. of chloroform is refluxed for six hours. Removal of the solvent in vacuo gives 10-[2'-(4''-chloroethyl-1''-piperazinyl)ethyl]-10-propionylthiaxanthene dihydrochloride.

A mixture of 30.0 ml. of β-hydroxyethyl ether in 30 ml. of dry benzene is treated with 0.7 g. of sodium. Five grams of the chloro intermediate prepared above is added and the mixture is heated on the steam bath for three hours, then stirred at room temperature for 18 hours. Water is added and the mixture is extracted with benzene. Extraction of the benzene solution with dilute acid, neutralization of the acid extracts, extraction with chloroform and evaporation of the chloroform extract gives 10 - [2' - (4''-hydroxyethoxyethoxyethyl-1'''-piperazinyl)-ethyl]-10-propionylthiaxanthene.

Example 15

A mixture of 35.0 g. of ethyl 10-thiaxanthenecarboxylate in 500 ml. of dry toluene and 5.0 g. of potassium is stirred at room temperature for two hours, then refluxed for ten minutes. To the cooled mixture is added 40.5 g. of 3-chloro-2-methyl-1-dimethylaminopropane. Refluxing for 24 hours and working up as in Example 2 gives ethyl 10 - (2'-methyl-3'-dimethylaminopropyl)-10-thiaxanthenecarboxylate.

This carboxylate (18.4 g.) in benzene solution is refluxed with an ethereal solution of ethyl magnesium bromide (prepared as in Example 1 from 2.6 g. of magnesium, 12.2 g. of ethyl bromide and 50 ml. of ether) for 12 hours. The reaction mixture is poured into excess ammonium chloride solution. Washing with benzene, making the aqueous layer basic with excess ammonium hydroxide, extracting with benzene and evaporating and distilling the combined benzene solutions gives 10-(2'-methyl - 3' - dimethylaminopropyl) - 10 - propionylthiaxanthene.

A solution of 1.0 g. of the free base in ethyl acetate is treated with maleic acid in ethyl acetic solution. Evaporation, dilution with ether and cooling gives 10-(2'-methyl - 3' - dimethylaminopropyl)-10-propionylthiaxanthene maleate.

Example 16

A solution of 50.8 g. of ethyl 9-xanthene-carboxylate in 500 ml. of toluene is treated with 7.8 g. of potassium. The resulting mixture is stirred at room temperature for two hours, then refluxed for ten minutes. To this mixture is added 32.1 g. of 2-chloro-1-dimethylaminoethane and the resulting mixture is refluxed for 24 hours. Ethanol (200 ml.) is added and the toluene layer is extracted with dilute hydrochloric acid. Neutralizing the acid extracts, extracting with chloroform and evaporating and distilling the chloroform extracts gives ethyl 9-(2'-dimethylaminoethyl)-9-xanthenecarboxylate.

A mixture of 2.6 g. of magnesium turnings, 12.2 g. of ethyl bromide and 50 ml. of dry ether is refluxed for one hour, then filtered. To this ether solution is added 16.2 g. of ethyl 9-(2'-dimethylaminoethyl)-9-xanthenecarboxylate in 125 ml. of dry benzene. The mixture is refluxed for 12 hours and worked up as in Example 15 to give 9-(2'-dimethylaminoethyl)-9-propionylxanthene.

The free base is converted to the hydrochloride salt by treatment with ethanolic hydrogen chloride.

Example 17

Potassium (7.8 g.) is added to a solution of 50.8 g. of ethyl 9-xanthenecarboxylate in 500 ml. of dry toluene. The mixture is stirred for two hours at room temperature, then heated to reflux. To this mixture is added 75.0 g. of N-(3'-bromopropyl)pyrrolidine. Refluxing for 30 hours, then working up as in Example 7 gives ethyl 9-(3'-N-pyrrolidinylpropyl)-9-xanthene-carboxylate.

A mixture of 18.0 g. of the above prepared carboxylate in 100 ml. of dry benzene and an ethereal solution of ethyl magnesium bromide (prepared from 2.6 g. of magnesium, 12.2 g. of ethyl bromide and 50 ml. of ether) is heated at reflux for ten hours, then poured into excess ammonium chloride solution. Extracting with benzene, making the aqueous solution basic with ammonium hydroxide, reextracting with benzene and removing the solvent from the combined benzene extracts in vacuo gives 9-propionyl-9-(3'-N-pyrrolidinylpropyl)-xanthene.

Reaction of a saturated ethereal solution of tartaric acid with the free base yields the corresponding tartrate salt.

Example 18

A solution of 33.2 g. of ethyl salicylate in 200 ml. of aqueous ethanol containing 8.0 g. of sodium hydroxide is treated with 45.0 g. of 1-chloro-2-nitro-4-trifluoromethylbenzene. The resulting mixture is refluxed for 30 minutes, diluted with water and acidified with dilute hydrochloric acid. Filtration of the precipitate gives o-(2'-nitro-4'-trifluoromethylphenoxy)-benzoic acid.

The above prepared nitro compound is added to a solution of 150 g. of stannous chloride dihydrate in 150 ml. of concentrated hydrochloric acid. The mixture is warmed on the steam bath at 85–90° C. for three hours, then poured into a cold solution of 200 g. of sodium hydroxide in 400 ml. of water. The precipitated product, o-(2'-amino-4'-trifluoromethylphenoxy)benzoic acid, is filtered off and washed with water.

A solution of 29.7 g. of o-(2'-amino-4'-trifluoromethylphenoxy)benzoic acid, 50 ml. of hydrochloric acid and 60 ml. of water is cooled to 10° C. and diazotized by the addition of 7.5 g. of sodium nitrite. Cold 50% aqueous hypophosphorous acid (70.0 g.) is added and the reaction mixture is kept at 0°–5° C. for 24 hours. Addition of 40% sodium hydroxide until the mixture is basic and filtration of the precipitate gives o-(4'-trifluoromethylphenoxy)benzoic acid. Heating this compound for 20 minutes with 20 ml. of concentrated sulfuric acid on the steam bath, cooling, pouring into water and collecting the precipitate gives 2-trifluoromethyl-9-xanthenone.

Reduction of this xanthenone by refluxing with isoamyl alcohol and sodium yields the corresponding xanthene, which is added to an ether solution of butyl lithium and refluxed for one hour. The mixture is cooled in Dry Ice and added, under nitrogen, to ether saturated with carbon dioxide at −50° C. Working up as in Example 4 gives 2-trifluoromethyl-9-xanthene carboxylic acid. Esterifying by refluxing in excess ethanol containing hydrogen chloride, and condensing with 2-chloro-1-dimethylaminopropane by refluxing in toluene solution gives ethyl 9-(2'-dimethylaminoethyl)-2-trifluoromethyl-9 - xanthenecarboxylate.

A mixture of 19.6 g. of the above prepared carboxylate in 130 ml. of dry benzene and an ethereal solution of ethyl magnesium bromide (made as in Example 1 from 2.6 g. of magnesium, 12.2 g. of ethyl bromide and 50 ml. of ether) is refluxed for 12 hours, then treated as in Example 7 to give 9-(2'-dimethyl-aminoethyl)-2-tri-fluoromethyl-9-propionylxanthene.

Example 19

Twenty grams of 2-trifluoromethyl-10-thiaxanthenone (prepared by condensation of thiosalicylic acid with 1-chloro-2-nitro-4-trifluoromethylbenzene in aqueous ethanol, reduction of the nitro group with stannous chloride and hydrochloric acid, removal of the amino group by diazotization and treatment with hypophosphorous acid and cyclization by refluxing the o-(4'-trifluoromethylphenylmercapto)benzoic acid with sulfuric acid as described in Example 18) in 200 ml. of refluxing isobutyl alcohol is treated with 10.0 g. of sodium. The resulting mixture is refluxed for 30 minutes. The excess alcohol is steam distilled. The residue is cooled, diluted with cold water and filtered. The solid product is 2-trifluoromethylthiaxanthene.

Butyl bromide (40.0 g.) in 50 ml. of ether is added to 5.0 g. of lithium in 300 ml. of ether slowly at −10° C. The mixture is gradually warmed to +6° C. Twenty grams of 2-trifluoromethylthiaxanthene is added and the mixture is refluxed for one hour, then cooled in Dry Ice and added, under nitrogen, to 500 ml. of ether saturated with carbon dioxide at −50° C. After stirring for two hours, filtering, adding ethanol and water, filtering, acidifying the aqueous layer and filtering 2-trifluoromethyl-10-thiaxanthene carboxylic acid is obtained.

The corresponding ethyl carboxylate is prepared by refluxing this carboxylate acid in excess ethanol containing hydrogen chloride, then concentrating the solution, adding ether, washing with water and sodium bicarbonate solution and distilling.

To a solution of 11.0 g. of ethyl 2-trifluoro-methyl-10-thiaxanthenecarboxylate in 170 ml. of dry toluene is added 1.6 g. of potassium and the mixture is stirred at room temperature for two hours, then heated to reflux. After cooling, 5.8 g. of 2-chloro-1-dimethylaminoethane in 25 ml. of toluene is added. The mixture is refluxed for 24 hours and worked up as in Example 7 to give ethyl 10-(2'-dimethylaminoethyl)-2-trifluoromethyl-10-thiaxanthenecarboxylate.

A mixture of 20.4 g. of the above prepared carboxylate in 140 ml. of dry benzene and ethereal ethyl magnesium bromide (prepared as in Example 1 from 2.6 g. of magnesium, 12.2 g. of ethyl bromide and 50 ml. of ether) is refluxed for ten hours, then poured into an excess of aqueous ammonium chloride. Working up as in Example 7 gives 10-(2'-dimethylaminoethyl)-2-trifluoromethyl-10-propionylthiaxanthene.

Example 20

Ten grams of lithium in 600 ml. of dry ether is treated with 80.0 g. of butyl bromide in 125 ml. of ether at −10° C. The mixture is warmed to +6° C. over two hours. Fifty grams of 2-methylxanthene is added and the resulting mixture is refluxed for one hour, then cooled in Dry Ice and added, under nitrogen, to one liter of dry ether saturated with carbon dioxide at −50° C. Working up as in Example 19 and esterifying by refluxing with ethanol containing hydrogen chloride gives ethyl 3-methyl-9-xanthenecarboxylate.

The above prepared carboxylate in toluene solution is condensed with 2-chloro-1-diethylaminoethane by refluxing for 24 hours and worked up as described in Example 16 to give ethyl 3-methyl-9-(2'-diethylaminoethyl)-9-xanthenecarboxylate.

A mixture of 5.2 g. of magnesium turnings in 50 ml. of dry ether and 24.3 g. of ethyl bromide in 50 ml. of dry ether is refluxed for 45 minutes, then filtered. Thirty-six grams of ethyl 3-methyl-9-(2'-diethylaminoethyl)-9-xanthenecarboxylate in 250 ml. of dry benzene is added slowly and the resulting mixture is refluxed for 11.5 hours, then poured into excess ammonium chloride. The mixture is worked up as in Example 17 to give 3-methyl-9-(2'-diethylaminoethyl)-9-propionylxanthene.

A solution of 1.0 g. of the free base in ethyl acetate is added to a solution of mandelic acid in ethanol. Concentration and cooling yields the mandelate salt.

Example 21

2-chloro-8-methyl-10-thiaxanthenone is reduced by refluxing with isoamyl alcohol and sodium to give 2-chloro-8-methyl-10-thiaxanthene which is treated with butyl lithium in ether solution and subsequently with a cold ether solution saturated with carbon dioxide to yield 2-chloro-8-methyl-10-thiaxanthene carboxylic acid.

To a solution of 31.8 g. of ethyl 2-chloro-8-methyl-10-thiaxanthenecarboxylate (prepared by refluxing the carboxylic acid in ethanol containing hydrogen chloride, concentrating, adding ether, washing with water and aqueous sodium carbonate and distilling the ethyl ester) in 300 ml. of dry toluene is added 3.9 g. of potassium. The resulting mixture is stirred for two hours at room temperature, then refluxed for ten minutes. 2-chloro-1-dimethylaminoethane (21.4 g.) is added slowly. After refluxing for 24 hours, ethanol is added. The toluene layer is extracted with ether. Evaporation and distillation of the ether extracts gives ethyl 2-chloro-8-methyl-10-(2'-dimethylaminoethyl)-10-thiaxanthenecarboxylate.

Treatment of the above prepared carboxylate in benzene solution with ethereal ethyl magnesium bromide as in Example 20 gives 2-chloro-8-methyl-10-(2'-dimethylaminoethyl)-10-propionylthiaxanthene.

Reacting a solution of the free base in ethyl acetate with excess maleic acid furnishes the maleate salt.

Example 22

2,7-dichloro-9-xanthenone is reduced with isoamyl alcohol and sodium, carboxylated by treating with butyl lithium in ether solution and with ether saturated with carbon dioxide and esterified to give ethyl 2,7-dichloro-9-xanthenecarboxylate.

Potassium (3.9 g.) is added to 32.2 g. of the above prepared carboxylate in 350 ml. of dry toluene. The mixture is stirred at room temperature for two hours, then heated to reflux. After cooling, 18.5 g. of 2-chloro-1-dimethylaminoethane is added and the mixture is refluxed for 24 hours. Working up the reaction mixture as in Example 16 yields ethyl 2,7-dichloro-9-(2'dimethylaminoethyl)-9-xanthenecarboxylate.

The reaction of 19.6 g. of this product with an ether solution of methyl magnesium iodide, carried out as in Example 3, gives 2,7-dichloro-9-(2'-dimethylaminoethyl)-9-acetylxanthene.

Example 23

A solution of 54.0 g. of ethyl 10-thiaxanthenecarboxylate in one liter of xylene is treated with 4.6 g. of sodium. After stirring for two hours, the mixture is heated to reflux. A solution of 44.0 g. of 2-chloroethyl-1-methylpiperidine in 200 ml. of xylene is added and the mixture is refluxed for 24 hours. Working up as in Example 7 furnishes ethyl 10-(1'-methyl-2'-piperidylethyl)-10-thiaxanthenecarboxylate.

Combining a benzene solution of the above prepared carboxylate with ethereal ethyl magnesium bromide, refluxing the resulting mixture for 12 hours and working up as in Example 7 gives 10-(1'-methyl-2'-piperidylethyl)-10-propionylthiaxanthene.

The free base is converted to the hydrochloride salt by treatment with ethanolic hydrogen chloride.

Example 24

1-bromo-9-xanthenone is reduced by refluxing in isobutanol containing sodium, carboxylated by treating with butyl lithium in ether solution and with a carbon dioxide saturated ether solution and esterified to give ethyl 1-bromo-9-xanthenecarboxylate.

To a solution of 33.4 g. of ethyl 1-bromo-9-xanthenecarboxylate in 350 ml. of toluene is added 3.9 g. of potassium and the mixture is stirred for two hours, then heated to reflux. To the cooled mixture 40.0 g. of N-(3-bromopropyl)piperidine is added. Refluxing for 24 hours, treating with 100 ml. of ethanol, extracting the toluene solution with dilute acid, neutralizing the acid extracts, extracting with chloroform and evaporating the solvent from the extracts gives ethyl 1-bromo-9-(3'-N-piperidylpropyl)-9-xanthenecarboxylate.

A solution of 12.0 g. of ethyl bromide in 25 ml. of ether is added slowly to 2.4 g. of magnesium turnings in 25 ml. of ether. The resulting mixture is refluxed for one hour and filtered. To this solution is added 22.9 g. of ethyl 1-bromo-9-(3'-N-piperidylpropyl)-9-xanthenecarboxylate in 150 ml. of benzene. The resulting mixture is refluxed for 12 hours, then poured into excess aqueous ammonium chloride and extracted with benzene. The aqueous acid solution is made basic and extracted with benzene. The combined benzene extracts are evaporated to give, as the residue, 1-bromo-9-(3'-N-piperidylpropyl)-9-propionylxanthene which is dissolved in ethyl acetate and treated with excess maleic acid to give the maleate salt.

*Example 25*

Heating a mixture of o-chlorobenzoic acid, sodium p-methylthiophenolate and copper powder for one hour at 150° C., extracting with ether, washing with dilute sodium hydroxide, saponifying the ester with potassium hydroxide and cyclizing by heating for five minutes with concentrated hydrochloric acid, making the solution alkaline with ammonium hydroxide and filtering the product gives 2-methylthio-9-xanthenone. Reduction by refluxing in isoamyl alcohol containing sodium, carboxylation by treatment with butyl lithium and carbon dioxide in ether solution and esterification gives ethyl 2-methylthio-9-xanthenecarboxylate.

The above prepared carboxylate is treated with potassium in toluene solution and condensed with 2-chloro-1-diethylaminoethane to give ethyl 9-(2'-diethylaminoethyl)-2-methylthio-9-xanthenecarboxylate.

Treating ethyl 9-(2'-diethylaminoethyl)-2-methylthio-9-xanthenecarboxylate with ethereal ethyl magnesium bromide, refluxing for 12 hours, pouring into excess ammonium chloride and working up as in Example 24 yields 9-(2'-diethylaminoethyl)-2-methylthio-9-propionylxanthene.

*Example 26*

A mixture of 35.0 g. of ethyl 10-thiaxanthenecarboxylate, 500 ml. of dry toluene and 5.0 g. of potassium is stirred for two hours, then heated to reflux. To the cooled mixture is added 36.0 g. of 2-chloro-1-dimethylaminopropane. The mixture is stirred for 24 hours at reflux temperature. Ethanol is added and the mixture is stirred for two hours. The toluene layer is extracted with dilute acid, the acid extracts are neutralized and extracted with chloroform and the chloroform extracts are concentrated in vacuo to give ethyl 10-(1'-methyl-2'-dimethylaminoethyl)-10-thiaxanthenecarboxylate.

The above prepared carboxylate is refluxed with ethereal ethyl magnesium bromide and the reaction mixture is worked up as in Example 24 to yield 10-(1'-methyl-2'-dimethylaminoethyl)-10-propionylthiaxanthene.

*Example 27*

Ethyl 10-thiaxanthenecarboxylate (17.5 g.) is stirred in 225 ml. of toluene with 2.5 g. of potassium for 2 hours, then refluxed for ten minutes. To the cooled mixture is added 18.0 g. of 1-chloro-2-dimethylaminopropane. After refluxing for 18 hours and working up as in Example 26, ethyl 10-(2'-dimethylaminopropyl)-10-thiaxanthenecarboxylate.

This carboxylate in benzene solution is refluxed for 12 hours with ethereal ethyl magnesium bromide. The reaction mixture is treated with aqueous ammonium chloride and further worked up as in Example 24 to give 10-(2'-dimethylaminopropyl)-10-propionylthiaxanthene.

A solution of the free base (0.5 g.) in 50 ml. of ether is reacted with an excess of glacial acetic acid to yield the acetate salt.

What is claimed is:

1. A chemical compound of the class consisting of a free base and its nontoxic, pharmaceutically acceptable, acid addition salts, the free base having the structural formula:

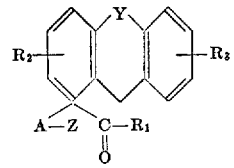

in which Y is a member selected from the group consisting of sulfur and oxygen; $R_1$ is lower alkyl; $R_2$ and $R_3$ are members selected from the group consisting of hydrogen, halogen having an atomic weight of less than 80, trifluoromethyl, lower alkyl, lower alkoxy and lower alkylthio; A is an alkylene chain having 2 to 4 carbon atoms; and Z is a member selected from the group consisting of di-lower alkylamino, N-pyrrolidinyl, N-piperidyl, C-(N-lower alkyl)piperidyl, N-piperazinyl, N'-formyl-N-piperazinyl, N'-lower alkyl-N-piperazinyl, N'-hydroxyethyl-N-piperazinyl, N'-acetoxyethyl-N-piperazinyl, N'-hydroxyethoxyethyl-N-piperazinyl and N'-hydroxyethoxyethoxyethyl-N-piperazinyl.

2. A chemical compound having the following basic structural formula:

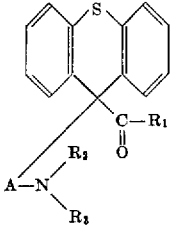

in which $R_1$, $R_2$ and $R_3$ are lower alkyl and A is an alkylene chain having 2 to 3 carbon atoms.

3. 10 - (2' - dimethylaminoethyl) - 10 - propionylthiaxanthene.

4. 10 - (2' - dimethylaminoethyl) - 10 - propionylthiaxanthene maleate.

5. 10 - (3' - dimethylaminopropyl) - 10 - propionylthiaxanthene.

6. 10 - acetyl - 10 - (2' - dimethylaminoethyl) - thiaxanthene.

7. 9 - (2' - dimethylaminoethyl) - 9 - propionylxanthene.

References Cited in the file of this patent

FOREIGN PATENTS 556,719    Canada _____ Apr. 29, 1958

OTHER REFERENCES

Conant: The Chemistry of Organic Compounds, p. 264, revised edition (1939).

Lowy et al.: Introduction to Organic Chemistry, pp. 213–224, sixth edition (1945).

UNITED STATES PATENT OFFICE
CERTIFICATE OF CORRECTION

Patent No. 3,095,425                                              June 25, 1963

Charles L. Zirkle

It is hereby certified that error appears in the above numbered patent requiring correction and that the said Letters Patent should read as corrected below.

Column 12, lines 13 to 20, the structural formula should appear as shown below instead of as in the patent:

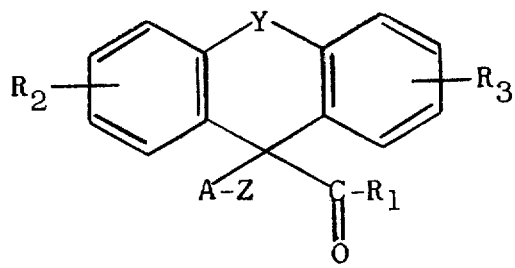

Signed and sealed this 24th day of December 1963.

(SEAL)
Attest:
ERNEST W. SWIDER

Attesting Officer

EDWIN L. REYNOLDS
Acting Commissioner of Patents